July 5, 1966 W. FALK 3,259,906

APPARATUS FOR RECORDING ON A STACK OF RECORD SHEETS

Filed Aug. 6, 1963 2 Sheets-Sheet 1

INVENTOR

Walter Falk by Michael S. Striker

Attorney

July 5, 1966 W. FALK 3,259,906

APPARATUS FOR RECORDING ON A STACK OF RECORD SHEETS

Filed Aug. 6, 1963 2 Sheets-Sheet 2

INVENTOR
Walter Falk
by Michael S. Striker
Attorney 3,259,906
Patented July 5, 1966

3,259,906

APPARATUS FOR RECORDING ON A STACK OF RECORD SHEETS

Walter Falk, Villingen, Black Forest, Germany, assignor to Kienzle Apparate G.m.b.H., Villingen, Black Forest, Germany Filed Aug. 6, 1963, Ser. No. 300,268
Claims priority, application Germany, Sept. 5, 1962, K 47,671
9 Claims. (Cl. 346—24)

Figure 1:
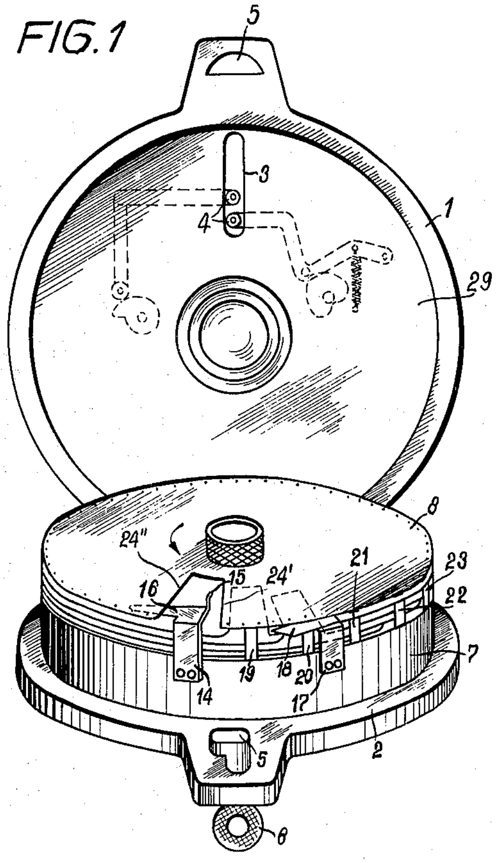

The present invention relates to an apparatus for recording on a stack of record sheets.

Recording apparatus is known in which a recording means, such as a recording stylus, makes continuous graphical recordings on successive record sheets which are arranged in a stack. The stack is rotated, and when the recording operation has been completed on the uppermost sheet, the same is stopped, and the recording operation continued on the next following rotating sheet with the recording stylus located in a suitably placed cutout of the stopped uppermost record sheet.

The record sheets of the stacks used in the known recording devices of this type, are connected to the adjacent record sheets by adhesive tapes. Each adhesive tape connecting two adjacent record sheets is angularly spaced from all other adhesive tapes connecting other pairs of adjacent record sheets. During the recording operation, a combined cutter and stop means cuts the adhesive tape between the two uppermost moving record sheets, and then stops the upper sheet of the respective two record sheets so that the recording operation can be continued on the lower sheet of this pair of record sheets.

The stacks used for this type of recording apparatus according to the known art can only be made by a manual operation which requires great care and attention, since the record sheets have to be assembled in predetermined angular positions relative to each other and then connected by adhesive tapes which are placed at exactly determined angularly spaced points of pairs of adjacent record sheets.

It has not been found possible to construct and design an apparatus or machine which could assemble and adhesively connect sets of record sheets forming a stack for continuous recording operations in an apparatus of the above described type. Therefore, in accordance with the known art, the stacks of record sheets have to be manually assembled and made in a very time consuming operation requiring great care and attention, so that the cost of the stacks of record sheets used for apparatus of this type is substantial.

It is one object of the present invention to provide a recording apparatus capable of continuous recording on a stack of record sheets which can be interconnected in a very simple and inexpensive manner.

Another object of the invention is to interconnect all record sheets of a stack by adhesive applied to the peripheral surface of the stack.

Another object of the present invention is to provide in a recording apparatus a severing means and a stop means spaced from each other and operable to sever two interconnected record sheets from each other, and to stop one of these two record sheets.

With these objects in view, the present invention relates to an improved recording apparatus which, in accordance with one embodiment of the invention comprises means for rotating a stack of interconnected record sheets in one direction about an axis; stop means for successively engaging each record sheet after the same has been filled with recordings; and severing means spaced from the stop means in the direction of rotation. The severing means sever each record sheet from the successive record sheet of the stack before the respective record sheet is stopped by the stop means. Due to the spacing of the stop means and severing means, all record sheets of the stack can be connected to each other at points spaced from each other the same angular distance, and the stop means can successively stop each record sheet after the same has been separated from the next following record sheet.

The record sheets have angularly spaced cutouts bounded by edges leading and trailing in the direction of rotation, and the stop means is located in the cutout of the record sheet when it engages the leading edge of the cutout for stopping the sheet. The cutouts of successively stopped record sheets are superimposed, and recording means are located spaced from the stop means leading the same in the direction of rotation, so as to move over the trailing edge of each record sheet before the same is stopped. In this manner, the recording means is located in the superimposed and registering cutouts of stopped record sheets, and records on the rotating successive record sheet.

In the preferred embodiment of the invention, the stop means includes a separating projection leading to a stop and adapted to slide on the uppermost record sheet so as to pass between the uppermost and next following record sheets when entering the cutout of the uppermost record sheet. In this manner, the leading edge of the cutout is guided into engagement with the stop.

The stack according to the present invention comprises a plurality of superimposed record sheets, each of which has a cutout. Adhesive means, such as a plurality of parallel adhesive strips extend along the height of the stack, the strips being spaced from each other about the peripheral surface of the stack the same angular distances as the uniformly angularly staggered cutouts of the record sheets of the stack. Consequently, the severing or cutting means of the recording apparatus cuts all adhesive connections between the uppermost and the next following sheets, until the last adhesive connection is cut, whereupon the stop means engages the uppermost sheet and stops the same in a position in which the recording stylus is located in the cutout of the uppermost stopped sheet, and starts recording on the next following still rotating sheet.

As explained above, the record sheets of the stack are connected only along the peripheral edges thereof by adhesive strips. This is similar to the adhesive connection of inexpensively bound books where the back edges of the sheets are connected by adhesive applied thereto. In the prior art, only two adjacent record sheets are adhesively connected and since the cutouts have to be angularly spaced, the adhesive connections also have to be angularly spaced. In accordance with the present invention, the adhesive connection is made along the entire height of the stack, and all record sheets are adhesively connected at a plurality of angularly spaced points. This requires cutting of all adhesive connections at several points of the peripheral edge of the respective pair of record sheets which have to be separated after recording on the upper sheet thereof has been completed. Since the cutouts, on which the stop means act, are angularly staggered, a different strip is the last one to be cut for each pair of record sheets. Adjacent record sheets must not be severed from each other before the respective upper record sheet is fully covered with a recording graph, or before the recording stylus has moved into the cutout of the upper sheet to record on the next following sheet. Therefore, in accordance with the present invention, the record sheets of each stack are connected in such a manner that an adhesive connection is effective for each pair of superimposed record sheets until the graph on the respective upper record sheet has been completed.

In accordance with the present invention, the stop leads the recording stylus, and the recording stylus leads the severing or cutting means in the direction of rotation so that the severing of the uppermost record sheet from the next following record sheet, and the continuation of the recording from the stopped uppermost record sheet to the next following still rotating record sheet are assured.

In accordance with the method of the invention for making the stack of record sheets, the same are superimposed in the desired angular positions in which the cutouts thereof are uniformly staggered, whereupon adhesive is applied along the entire height of the peripheral surface of the stack of record sheets. Several stacks can be simultaneously provided with adhesive strips in superimposed condition forming a column of stacks and record sheets. The operation is particularly facilitated, if a guide edge or guide projection is provided on each record sheet, so that the cutouts are in the desired angularly spaced position when the guide edges or projetcions are aligned along the height of the column.

Figure 1A:
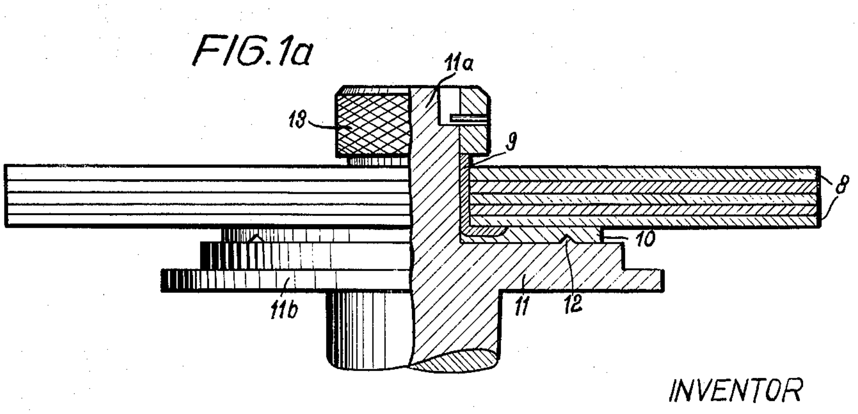
Figure 2:
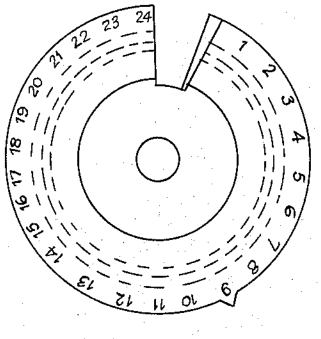
Figure 2A:
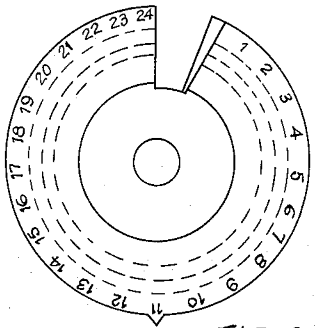
Figure 2B:
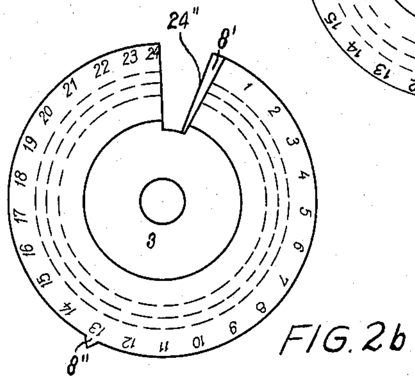
Figure 3:
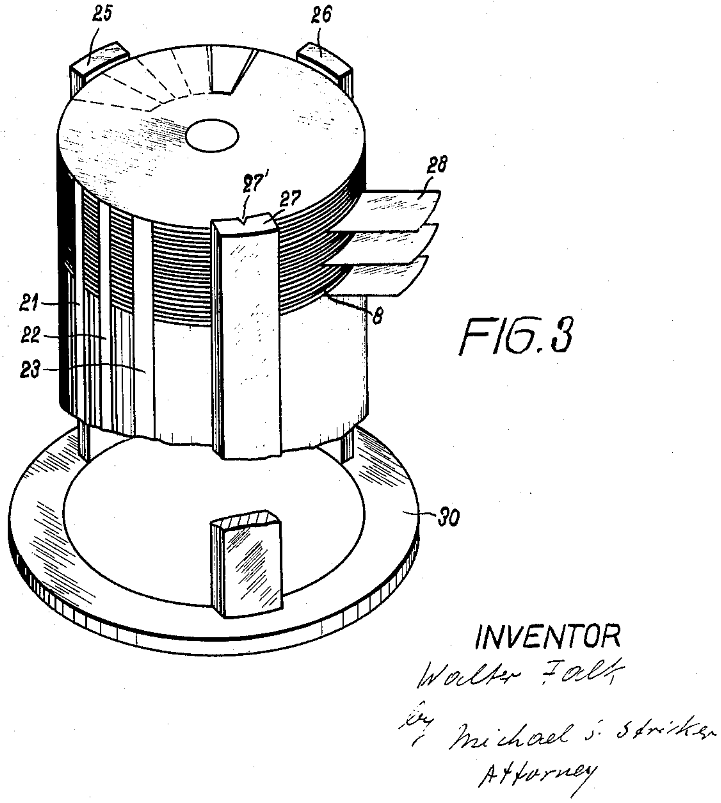

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings in which:

FIG. 1 is a perspective view illustrating a recording apparatus according to the present invention with a stack of record sheets according to the present invention;

FIG. 1*a* is a fragmentary side elevation, partially in axial section, illustrating the mounting of a stack of record sheets in the recording apparatus;

FIG. 2, FIG. 2*a* and FIG. 2*b* are developed plan views illustrating three successive record sheets in adjacent positions; and FIG. 3 is a perspective view illustrating a device for performing the method of the invention, and a column of stacks of record sheets formed during the manufacture of stacks of record sheets according to the invention.

Referring now to the drawings, and more particularly to FIG. 1, the recording apparatus is of a standard construction including a housing 1 in which measuring apparatus is located behind a cover plate 29, and controls recording means 4 which project through a slot 3 in cover plate 29. A hinge, not shown, connects a pivotable lid or cover means 2 with housing 1, so that the lid 2 can be turned to a position closing housing 1, in which position the recording means 4 are in recording engagement with the uppermost record sheet of a stack of record sheets 8.

The lid 2 houses a clockwork mechanism connected to supporting means 11, see FIG. 1*a*, on which the stack of record sheets 8 is mounted for rotation at a rotary speed determined by the clockwork, not shown.

Each record sheet is of circular shape, and has a central circular opening. The circular peripheral edges of the record sheets are connected by strips of an adhesive material 19, 20, 21, 22, 23 and so on, the number of strips corresponding to the number of record sheets in the stack, as will be explained hereinafter in greater detail.

The stack 8 of record sheets is placed on a tubular member 9 which is mounted on a core part **11*a* of the rotary support 11. A head 13 is connected by bayonet means to the core member 11*a* so that the tubular member 9 can be pressed toward the flange 11*b* of the rotary support 11**.

The stack 8 would be freely turnable on the tubular member 9, but an adhesive tape 10 is adhesively attached to a small flange of tubular member 9, and to the lowermost record sheet of the stack, so that the stack will turn with support means 11 as long as the adhesive strips 19, 20, 21, etc., connect all record sheets of the stack. A number of pointed projections 12 project upwardly from flange **11*b* to penetrate into the adhesive tape 10 only, without reaching the lowermost record sheet of stack 8. Thus, each record sheet can be stopped, including the lowermost record sheet, while the rotary support 11 continues to rotate. However, as long as the record sheets of stack 8 are adhesively interconnected, the entire stack will rotate with the rotary support means 11**.

Each record sheet is provided with a cutout 24 in the circular periphery thereof, and the record sheets of the stack are disposed in relative angular positions in which the cutouts 24 are uniformly angularly spaced, as best seen in FIG. 1. Each cutout has a trailing edge 24′, and a leading edge 24″, assuming a counterclockwise direction of rotation in the arrangement of FIG. 1. Edges 24′ and 24″ extend in substantially radial direction in relation to the axis of rotation of support means 11 and of stack 8. Each record sheet is intended to receive a recorded graph during a period of 24 hours, and is consequently provided with a scale with 24 graduations corresponding to hours. As best seen in FIG. 2, the circular scale does not extend along the entire periphery of the record sheet, but only covers the part which is not interrupted by the cutout 24. It is preferred to provide a narrow angular area 8′ adjacent the leading edge 24″, and to place the zero point of the scale not at the leading edge 24″, but at the end of the area 8′.

As a result, it is possible to place the record sheets in the position shown in FIG. 1 in which the leading edge of each record sheet leads, and is slightly spaced in circumferential direction from the trailing edge 24′ of the preceding record sheet. When the recording stylus 4 passes over the trailing edge 24′ of the uppermost sheet, and over the corresponding last graduation of the scale on the uppermost sheet, it will drop directly on the zero point of the scale of the record sheet directly below, and continue to record on the same. Without the area 8′, it would be necessary to exactly superimpose the trailing edge 24′ of each sheet on the leading edge 24″ of the next following sheet to assure a continuous recording on successive record sheets.

Since a record sheet does not perform a complete revolution during 24 hours, the clockwork, not shown, must be correspondingly designed so that it does not make a complete revolution in 24 hours, as is conventional in most recording devices.

On the stationary collar 7 of lid 2, two brackets 14 and 17 are fixedly mounted. Bracket 14 carries an upwardly projecting stop 15, and separator means in the form of a separating projection 16 which is arranged so as to first slide under the leading edge 24″ of a first rotating record sheet onto the next sheet before the leading edge of the first sheet engages stop 15.

During rotation of the complete stack, the separating projection 16 will slide on the rotating uppermost sheet until it passes over the trailing edge 24′ to slide on the next lower sheet while located in the cutout 24 of the uppermost sheet. When the leading edge 24″ of the uppermost sheet passes over the tip of the separating projection 16, it is guided by an inclined top face of the same into engagement with stop 15, so that the uppermost record sheet is stopped. At this moment, the recording stylus 4 passes over the trailing edge 24′, and starts recording on the next lower record sheet, since the stylus is now located in the cutout 24 of the stopped uppermost record sheet.

The bracket 17 supports a severing or cutting means 18 which projects across the peripheral edges of the record sheets of the stack. At the beginning of the operation, the stack 8 was placed in the apparatus in a position in which the cutter 18 was located in the cutout 24. When rotation of the stack 8 was started, the cutter 18 passed under the uppermost record sheet, and was successively crossed by the adhesive means connecting the peripheral edges of the first and second record sheets so as to cut all strips of adhesive with the exception of adhesive strip 19 until the position of FIG. 1 was reached.

In the position of FIG. 1 the uppermost record sheet is connected to the next following record sheet, and to all other record sheets only by the adhesive strip 19. The uppermost record sheet is in a position in which it is slightly raised by the separating projection 16 which guides the leading edge 24″ toward stop 15. When rotation of the stack continues in counterclockwise direction as viewed in FIG. 1, cutter 18 will cut adhesive strip 19 between the uppermost sheet and the next following sheet, and in this moment, recording means 4 will pass over the trailing edge 24′ of the uppermost record sheet, and record through cutout 24 of the uppermost sheet on the next following record sheet which continues to rotate, while the uppermost record sheet 18 is stopped at the same moment by stop 15 engaging the leading edge 24″ of the uppermost record sheet.

After cutting adhesive strip 19, cutter 18 moves into the cutout 24 of the second record sheet, sliding on the third record sheet and finally passing under the second record sheet with the leading edge 24″ of the second record sheet passing over the cutting means 18. During continuous rotation of all record sheets of the stack with exception of the uppermost record sheet, cutter 18 will cut all adhesive strips connecting the second and third record sheets until the second and third record sheets are in the position corresponding to the position explained for the first two record sheets with respect to FIG. 1.

Cutter 18 is a blade of sufficient resiliency to assume a position located between the two lowermost sheets of the stack, the height of the stack being exaggerated in FIGS. 1 and 1*a* since generally seven record sheets of thin paper are provided for receiving continuous recordings during one week.

In order to start recording operations on a new stack 8, the recording apparatus is opened, the stack 8 is connected by an adhesive tape 10 to the tubular member 9, and placed on the core **11*a* of the rotary support 11 whereupon the bayonet head 13 is tightened. The lid 2 is closed, and the housing 1 is locked to the lid 2 by a lock 5 operated by key 6. The measuring mechanism in housing 1 is connected to the element whose operations are to be graphically recorded, for example to the indicator of a speedometer, so that the recording means move in slot 3 between inner and outer radial positions corresponding to different measured values, such as speeds. The clockwork, not shown, in lid 2 turns the rotary support 11, which through the pointed projection 12 engages the adhesive tape 10 to which the lowermost recording sheet of stack 8 is secured, so that the entire stack 8 rotates. Since cutter 18 was located in the cutout of the uppermost record sheet 8, it passes between the uppermost sheet and the next lower sheet, and during the following revolution, all adhesive connections are cut, except adhesive strip 19** when the position of FIG. 1 is assumed.

As explained above, strip 19 is now cut, recording stylus means 4 passes over the trailing edge 24′, the leading 24″ is stopped by stop 15, and recording is continued on the next lower record sheet. Since the scale of the uppermost record sheets ends at trailing edge 24′, and the scale of the next following record sheet starts an angular distance 8′ behind the leading edge 24″ of the second sheet, a continuous recording on successive scales is achieved on successive days.

A stack according to the present invention is composed of a number of record sheets, for example seven record sheets, each of which has cutouts 24, the cutout being uniformly staggered the same angular distance about the cylindrical surface of the stack which is formed by the superimposed peripheral circular edges of the record sheets. Adhesive means extend between the first and the last sheet of the stack along the height of the same, or of several superimposed stacks, and connect the peripheral edges of the same. Parallel adhesive strips 19 are spaced about the peripheral surface of the stack, spaced from each other the same angular distance as the cutouts of the several record sheets, so that the same numbers of adhesive strips, record sheets, and cutouts are provided. The angular spacing between the adhesive strips and the cutouts must be selected in accordance with the operation in the above described apparatus. For example, the adhesive strip 19 is angularly spaced from edge 24″ so as to be just severed by the cutter 18 when stop 15 stops the uppermost record sheet, and the adhesive strip 20 must be severed when the next following record sheet is stopped by stop 15.

In order to facilitate the stacking of the record sheets in angularly spaced positions, each record sheet has a projection 8″, as best seen in FIG. 2. The guide projections 8″ of the record sheets are spaced different distances from the respective cutouts 24, the difference corresponding to the angular distance between the cutouts 24 of adjacent record sheets. Consequently, when all guide projections 8″ are aligned and registered, the cutouts 24 are properly staggered and angularly spaced in the stack. As shown in FIG. 2, the guide projection 8″ of the first record sheet is placed in the region of the graduation nine o'clock of the scale, the second record sheet has the guide projection at 11 o'clock, and the third record sheet has the guide projection 8″ at 13 o'clock, corresponding to 1 p.m. A two hour interval is chosen corresponding to the angular extension of cutout 24 which corresponds to two hours on the scale.

The method of making a stack according to the present invention will be best understood with reference to FIG. 3. A simple device is used for the assembly of the stacks, and includes three upright guide members 25, 26 and 27, and a bottom plate 30, on which the record sheets are successively placed. Guide member 27 has a longitudinal groove 27′ for receiving the superimposed guide projections 8″ of superimposed record sheets. First, seven record sheets are superimposed in the proper angular position. Seven different record sheets having the guide projections 8″ in different angular positions are used for each stack. When the first stack is completed, a separating tab 28 is placed on top of the stack, and the next stack is assembled and again separated from the following stack by a tab 28. In this manner, a column of stacks 8 is formed, and the outer cylindrical surface of the column is formed by the peripheral surfaces of the stacks. When the column is completed, the adhesive strips 21, 22, 23, etc. are made along the height of the column by applying an adhesive substance to the outer surface of the column. After drying of the adhesive substance, all edges, and very small face portions of the record sheets adjacent the peripheral edges are connected by the adhesive. While the adhesive is only applied to the peripheral edges of the record sheets, it may penetrate slightly between the same to form a more solid adhesive connection.

When the thus made adhesive strips have dried, the stacks are separated in the region of the separating tabs by severing the adhesive strips, and the stacks are separated from each other for use in the apparatus described with reference to FIGS. 1 and 1*a*.

In the preferred embodiment of the invention guide projections 8″ are provided, but it will be understood that instead of a projection, a cutout corresponding with a projection on guide member 26 could as well be provided. All that is necessary is to provide a guide edge on each record sheet, and to align such guide edges which preferably transverse to the peripheral edge of the record sheet. Either side of the triangular guide projection 8″ serves the function of such a guide edge.

It will be understood that each of the elements described above or two or more together, may also find a useful application in other types of recording apparatus differing from the types described above.

While the invention has been illustrated and described as embodied in a stack of adhesively connected record sheets it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In an apparatus for continuously recording on successive record sheets of a stack, in combination, a stack of record sheets, each sheet having a cutout, said cutouts being angularly staggered about the periphery of the stack; adhesive means extending between the first sheet and the last sheet of said stack along the entire height of said stack and connecting said peripheral edges of all the sheets of said stack; rotary support means connected to said stack for rotating said stack in a predetermined direction; stationary severing means constructed and positioned to pass through the cutout of the first sheet in an initial position of said stack, said severing means being located during the entire first revolution of said support means with said stack between said first and the following sheet so as to sever said adhesive means about the entire periphery of the rotating stack between said first sheet and the following second sheet whereby said first sheet is separated along its entire periphery from said second sheet; and stop means constructed and positioned to engage the outer surface of said first sheet during the first revolution and to pass through the cutout in said first sheet onto the surface of said second sheet for stopping said first sheet, said stop means being positioned in said predetermined direction a small angular distance before said severing means so as to stop said first sheet after the same is severed along its entire periphery by said severing means from said second sheet so that during continued rotation of said support means with said stack, said severing means passes through said cutouts of successive sheets to sever each sheet from the following sheet and said stop means passes through said cutout of the sheet being severed to stop each severed sheet so that the cutouts of stopped sheets are superimposed.

2. In an apparatus for continuously recording on successive record sheets of a stack, in combination, a stack of record sheets, each sheet having a cutout, said cutouts being angularly staggered about the periphery of the stack; adhesive means extending between the first sheet and the last sheet of said stack along the entire height of said stack and connecting said peripheral edges of all the sheets of said stack; rotary support means connected to the last sheet of said stack for rotating said stack in a predetermined direction; stationary severing means constructed and positioned to pass through the cutout of the first sheet in an initial position of said stack, said severing means being located during the entire first revolution of said support means with said stack between said first and the following next sheet so as to sever said adhesive means about the entire periphery of the rotating stack between said first sheet and the following second sheet whereby said first sheet is separated along the entire periphery from said second sheet when said cutout of said second sheet approaches said severing means; and stop means constructed and positioned to engage the outer surface of said first sheet during the first revolution and to pass through the cutout in said first sheet onto the surface of said second sheet for stopping said first sheet, said stop means being positioned in said predetermined direction a small angular distance before said severing means so as to stop said first sheet after the same is severed by said severing means along its entire periphery from said second sheet so that during continued rotation of said support means with said stack, said severing means passes through said cutouts of successive sheets to sever each sheet from the following sheet and said stop means passes through said cutout of the sheet being severed to stop each severed sheet so that the cutouts of stopped sheets are superimposed.

3. An apparatus according to claim 2 wherein each said cutout has a pair of edges transverse to the periphery of said stack; wherein one edge of each cutout leads and the other edge of each cutout trails in said predetermined direction of rotation; wherein said first sheet is separated from said second sheet when said trailing edge of said cutout approaches said severing means; and wherein said stop means engages said leading edge of the respective cutout for stopping said first sheet so that during continued rotation of said stack, said leading edges and said cutouts of stopped sheets are superimposed.

4. An apparatus according to claim 2 wherein said stop means includes a separator means engaging the outer surface of the first sheet during the first revolution and passing through the cutout in the first sheet onto the surface of the second sheet, and a stop projecting from said separator means for stopping said first sheet.

5. An apparatus according to claim 4 wherein each cutout has a pair of edges transverse to the periphery of said stack, one of said edges leading, and the other of said edges trailing in said predetermined direction; wherein said said first sheet is separated from the second sheet when said trailing edge of said cutout of said second sheet approaches said severing means; and wherein said stop engages said leading edge of the respective cutout for stopping said first sheet; and wherein said separator means is a thin flexible separating projection positioned in a plane parallel to said sheets so as to engage the outer surface of the first sheet during the first revolution; and wherein said stop leads said separating projection and projects in the direction of the height of said stack through said cutout in said first sheet.

6. An apparatus according to claim 5 wherein said severing means is a stationary thin flat flexible cutter positioned in a plane parallel to said sheets so as to pass through said cutout of said first sheet in the intial position of said stack.

7. An apparatus according to claim 5 wherein said adhesive means include a plurality of strips, each of said adhesive strips being located adjacent one of said cutouts and leading the respective adjacent cutout in said predetermined direction of rotation.

8. An apparatus according to claim 1 wherein said adhesive means includes a plurality of adhesive strips disposed spaced from each other about the periphery of said stack and extending along the entire height of the same, each adhesive strip being located adjacent one of said cutouts and leading the respective adjacent cutout in said predetermined direction of rotation.

9. An apparatus according to claim 1 and including recording means leading said stop means in said predetermined direction of rotation and positioned to record on said first sheet during said first revolution and to be located in said cutout of said stopped first sheet for recording on the following second sheet, said recording means recording on each rotating sheet located under a stopped sheet.

(References on following page)

References Cited by the Examiner

UNITED STATES PATENTS

| | | | |
|---|---|---|---|
| 2,277,265 | 3/1942 | Lahniser | 281—21 |
| 2,523,860 | 9/1950 | Budden | 281—21 |
| 2,631,919 | 3/1953 | Dueringer | 346—137 |
| 2,663,609 | 12/1953 | Jones | 346—24 |
| 2,739,031 | 3/1956 | Meer | 346—24 X |
| 2,927,835 | 3/1960 | Virbila | 346—24 |

FOREIGN PATENTS

| | | |
|---|---|---|
| 529,038 | 11/1940 | Great Britain. |
| 646,988 | 12/1950 | Great Britain. |
| 213,282 | 5/1941 | Switzerland. |

LOUIS J. CAPOZI, *Primary Examiner.*

LEO SMILOW, *Examiner.*

JOSEPH W. HARTARY, *Assistant Examiner.*